(12) United States Patent
Roschmann et al.

(10) Patent No.: US 7,943,704 B2
(45) Date of Patent: May 17, 2011

(54) METHOD FOR PRODUCING EMULSION POLYMERS

(75) Inventors: Konrad Roschmann, Ludwigshafen-Edigheim (DE); Arno Tuchbreiter, Speyer (DE); Ekkehard Jahns, Weinheim (DE); Joerg Leuninger, Mainz (DE); Bernhard Schuler, Mannheim (DE); Oliver Wagner, Osthofen (DE); Michaela Reinsch, Neustadt (DE); Robert Wrazidlo, Ellerstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 541 days.

(21) Appl. No.: 11/994,593

(22) PCT Filed: Jul. 10, 2006

(86) PCT No.: PCT/EP2006/064041
§ 371 (c)(1),
(2), (4) Date: Jan. 3, 2008

(87) PCT Pub. No.: WO2007/006766
PCT Pub. Date: Jan. 18, 2007

(65) Prior Publication Data
US 2010/0063171 A1    Mar. 11, 2010

(30) Foreign Application Priority Data

Jul. 14, 2005   (DE) .................. 10 2005 033 516

(51) Int. Cl.
C08F 285/00   (2006.01)
C08F 265/04   (2006.01)
C08F 2/22     (2006.01)

(52) U.S. Cl. ........ 525/243; 525/242; 525/244; 525/246; 525/902; 525/316; 526/82; 521/55; 106/677; 524/457; 524/458

(58) Field of Classification Search .............. 525/242, 525/243, 316, 902, 244, 246; 526/82; 521/55; 106/677; 524/457, 458
See application file for complete search history.

(56) References Cited

U.S. PATENT DOCUMENTS

| 5,360,827 A | 11/1994 | Toda et al. |
| 5,618,888 A | 4/1997 | Choi et al. |
| 2004/0176554 A1* | 9/2004 | Ishida ......................... 526/242 |
| 2005/0014883 A1* | 1/2005 | Blankenship et al. ........ 524/458 |

FOREIGN PATENT DOCUMENTS

| EP | 0 022 633 A2 | 1/1981 |
| EP | 0 404 184 A2 | 12/1990 |
| EP | 0 696 602 A1 | 2/1996 |
| EP | 0 915 108 A1 | 5/1999 |
| EP | 0 959 176 A1 | 11/1999 |
| EP | 1 197 503 A2 | 4/2002 |
| WO | WO 00/68304 | 11/2000 |

OTHER PUBLICATIONS

Brandrup et al. The Polymer Handbook, 4th edition, 1999.*
Brandrup et al The Polymer Handbook 4th edition 1999.*
Charles J. McDonald, et al., "Hollow latex particles: synthesis and applications", Advances in Colloid and Interface Science, vol. 99, 2002, pp. 181-213.

* cited by examiner

Primary Examiner — Vasu Jagannathan
Assistant Examiner — Mark S Kaucher
(74) Attorney, Agent, or Firm — Oblon, Spivak, McClelland, Maier & Neustadt, L.L.P.

(57) ABSTRACT

The present invention provides a process for preparing emulsion polymer particles of a hollow core/shell structure in the presence of a monomer plasticizer having a ceiling temperature less than 181° C. wherein a polymerization inhibitor or reducing agent is not added to the aqueous emulsion of the core shell particles during the neutralization and swelling stage. The obtained core shell particles are useful in paints, paper coatings, foams, and cosmetics.

22 Claims, No Drawings

METHOD FOR PRODUCING EMULSION POLYMERS

CROSS-REFERENCE TO RELATED APPLICATIONS

The present application is a 35 U.S.C. §371 National Stage patent application of International patent application PCT/EP06/064041, filed on Jul. 10, 2006, which claims priority to German patent application DE 102005033516.0, filed on Jul. 14, 2005.

The present invention relates to a process for preparing emulsion polymer particles having a core/shell structure and also to their use in paints, paper coatings, foams, and cosmetics.

Hollow organic particles are a particular variety of core/shell particles composed in dried form of an air-filled cavity surrounded by a hard shell. This construction gives them the particular property of scattering light, which is the reason for their use as a white pigment in paints, paper coatings, and cosmetics, suncreams for example. In such systems they replace part of the inorganic white pigment titanium dioxide, and also boost the effect of the remaining $TiO_2$.

C. J. McDonald and M. J. Devon, in Advances in Colloid and Interface Science 2002, 99, 181-213, describe a range of possibilities for producing these hollow particles, including swelling with organic solvents or blowing agents, encapsulation of hydrocarbons, or approaches building on W/O/W emulsions. The method that is preferred, however, on both environmental and economic grounds, is the osmotic swelling of specific core/shell particles.

EP 226 33 describes this operation fundamentally. In a first step a hydrophilic core composed of 15-70% of a polymerizable acid such as acrylic or methacrylic acid is prepared, and is subsequently ensheathed with a hard, hydrophobic shell composed of >90% of nonionic monomers such as styrene. After the core/shell particle has been completed it is swollen, at a temperature of or above the glass transition temperature of the shell, with ammonia or another volatile base.

EP 915 108, EP 959 176, EP 404 184, U.S. Pat. No. 5,360,827, and WO 00/68304 describe a refinement of the above operation. To facilitate swelling the shell is plasticized by the addition of monomers or organic solvents, and this plasticizer, after swelling has taken place, can be removed from the system simply, by reactive consumption, by adding free-radical initiator, or remains in the system. The use of monomers as plasticizers, however, is tied to certain conditions. Because of their inherent reactivity any premature reaction must be prevented at all costs; in other words, there must be no notable reaction of the monomer. Measures taught in pursuit of this objective include waiting for the free-radical initiator to have been fully consumed by reaction, lowering the swelling temperature, and adding a polymerization inhibitor or a reducing agent.

This approach, however, is hampered by a number of disadvantages. Not only that, as a result of the waiting time, it is necessary to accept prolonged cycle times, in view of the lower swelling temperature necessary in comparison to the conventional operation it is not possible to fully exploit the plasticizing and hence $T_g$-lowering effect of the monomer. The most serious side effects, however, are those of the use of polymerization inhibitors, since these, naturally, counteract the final depletion of the monomer. In certain circumstances this results in the maximum monomer concentrations being achieved, not at the desired moment of swelling but only later, when a further shell, serving for mechanical stabilization, is applied. This significantly weakens said shell and in a worse-case scenario, as a result of terminal plastic flow, may result in its total destruction.

It was an object of the present invention, therefore, to develop a preparation process for emulsion polymer particles, particularly for hollow organic particles, that avoids the disadvantages of the prior-art processes and which exhibits high monomer concentrations at the moment of swelling.

This object has been achieved in accordance with the invention by means of a process for preparing emulsion polymer particles by preparing an aqueous emulsion comprising a multistage emulsion polymer comprising
i) a seed
ii) a swell seed comprising 0 to 100% by weight of at least one nonionically ethylenically unsaturated monomer and 0 to 40% by weight of at least one monoethylenically unsaturated hydrophilic monomer, based in each case on the total weight of the core stage polymer comprising both the seed and the swell seed
iii) a first shell comprising 85% to 99.9% by weight of at least one nonionically ethylenically unsaturated monomer and 0.1% to 15% by weight of at least one hydrophilic monoethylenically unsaturated monomer
(iv) a second shell comprising 85% to 99.9% by weight of at least one nonionically ethylenically unsaturated monomer and 0.1% to 15% by weight of at least one hydrophilic monoethylenically unsaturated monomer
v) at least one plasticizer monomer having a ceiling temperature of less than 181° C., preferably less than 95° C.
vi) neutralizing to a pH of at least 7.5 or more, preferably more than 8, the resultant particles with a base
vii) a third shell comprising 90% to 99.9% by weight of at least one nonionically ethylenically unsaturated monomer and 0.1% to 10% by weight of at least one hydrophilic monoethylenically unsaturated monomer
viii) and, if appropriate, further shells comprising at least one nonionically ethylenically unsaturated monomer and at least one hydrophilic monoethylenically unsaturated monomer.

The invention further provides for the use of the inventively prepared emulsion polymers in paints, paper coatings, foams or cosmetics.

One advantage of the invention is that in stage (iv), when using monomers whose ceiling temperature (Frieder Vieweg & Sohn Verlagsgesellschaft mbH, Braunschweig/Wiesbaden, 1997) is below the swelling temperature or—as an extreme case thereof—monomers which for thermodynamic reasons are unable to form a homopolymer, the disadvantages of the prior art can be gotten around and swelling is possible without addition of polymerization inhibitors or reducing agents, even in the presence of residual amounts of initiator.

The described invention relates to a multistage sequential emulsion polymerization. "Sequential" relates to the implementation of the individual stages, it also being possible for each individual stage to be composed of a plurality of sequential steps.

The term "seed" relates to an aqueous polymer dispersion which is used at the beginning of the multistage polymerization and is the product of an emulsion polymerization, or may relate to an aqueous polymer dispersion present at the end of one of the polymerization stages for preparing the hollow particle dispersion, with the exception of the last stage.

The seed which is used at the beginning of the polymerization of the first stage can also be prepared in situ and is composed preferably of acrylic acid, methacrylic acid, esters of acrylic acid and methacrylic acid, or mixtures thereof.

Particularly preferred mixtures are those of n-butyl acrylate, methyl methacrylate, and methacrylic acid.

The average particle size of the seed polymer in the unswollen state is 40 to 100 nm, preferably 60 to 90 nm.

The swell seed comprises 0 to 100% by weight, preferably 55% to 80% by weight, of a nonionically ethylenically unsaturated monomer and 0 to 45% by weight, preferably 20% to 35% by weight, of a monoethylenically unsaturated hydrophilic monomer.

The weight ratio of the swell seed (ii) to the seed polymer (i) is 2:1 to 50:1, preferably 2:1 to 30:1. The average particle size, in the unswollen state, of the core stage polymer composed of seed (i) and swell seed (ii) is 100 to 400 nm, preferably 100 to 250 nm.

The glass transition temperature, determined by the Fox equation (John Wiley & Sons Ltd., Baffins Lane, Chichester, England, 1997), of the core stage polymer is between −20° C. and 150° C.

The nonionically ethylenically unsaturated monomers comprehend styrene, vinyltoluene, ethylene, butadiene, vinyl acetate, vinyl chloride, vinylidene chloride, acrylonitrile, acrylamide, methacrylamide, ($C_1$-$C_{20}$)alkyl or ($C_3$-$C_{20}$)alkenyl esters of acrylic or methacrylic acid, methyl acrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, monomers comprising hydroxyl groups, especially $C_1$-$C_{10}$ hydroxyalkyl (meth) acrylates, such as hydroxyethyl (meth)acrylate, hydroxypropyl (meth)acrylate, glycidyl (meth)acrylate, ricinoleic acid, palmitoleic acid, oleic acid, elaidinic acid, vaccenic acid, icosenoic acid, cetoleic acid, erucic acid, nervonic acid, linoleic acid, linolenic acid, arachidonic acid, timnodonic acid, and clupanodonic acid.

The monoethylenically unsaturated hydrophilic monomers comprehend acrylic acid, methacrylic acid, acryloyloxypropionic acid, methacryloyloxypropionic acid, acryloyloxyacetic acid, methacryloyloxyacetic acid, crotonic acid, aconitic acid, itaconic acid, monomethyl maleate, maleic acid, monomethyl itaconate, maleic anhydride, fumaric acid, monomethyl fumarate, itaconic anhydride, and itaconic acid monomethyl ester.

The first shell (iii) comprises 85% to 99.9% by weight of at least one nonionically ethylenically unsaturated monomer, preferably 90% to 99.9% by weight, and 0.1% to 15% by weight, preferably 0.1% to 10% by weight, of at least one hydrophilic monoethylenically unsaturated monomer.

The nonionically ethylenically unsaturated monomers comprehend styrene, vinyltoluene, ethylene, butadiene, vinyl acetate, vinyl chloride, vinylidene chloride, acrylonitrile, acrylamide, methacrylamide, ($C_1$-$C_{20}$)alkyl or ($C_3$-$C_{20}$)alkenyl esters of acrylic or methacrylic acid, methyl acrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, monomers comprising hydroxyl groups, especially $C_1$-$C_{10}$ hydroxyalkyl (meth) acrylates, such as hydroxyethyl (meth)acrylate, hydroxypropyl (meth)acrylate, glycidyl (meth)acrylate, ricinoleic acid, palmitoleic acid, oleic acid, elaidinic acid, vaccenic acid, icosenoic acid, cetoleic acid, erucic acid, nervonic acid, linoleic acid, linolenic acid, arachidonic acid, timnodonic acid, and clupanodonic acid, preferably styrene, acrylonitrile, methacrylamide, methyl acrylate, methyl methacrylate, ethyl acrylate, ethyl methacrylate, butyl acrylate, butyl methacrylate, 2-ethylhexyl acrylate, and 2-ethylhexyl methacrylate.

The monoethylenically unsaturated hydrophilic monomers comprehend acrylic acid, methacrylic acid, acryloyloxypropionic acid, methacryloyloxypropionic acid, acryloyloxyacetic acid, methacryloyloxyacetic acid, crotonic acid, aconitic acid, itaconic acid, monomethyl maleate, maleic acid, monomethyl itaconate, maleic anhydride, fumaric acid, monomethyl fumarate, preferably acrylic acid, methacrylic acid, itaconic acid, itaconic anhydride, and itaconic acid monomethyl ester.

This first shell (iii) encloses the core stage polymer. The weight ratio of the core stage polymer to the first shell (iii) is 20:1 to 1:1, preferably 10:1 to 1:1, and the shell polymer possesses a glass transition temperature according to the Fox equation of between −60° C. to 120° C.

The particle size of this stage in the unswollen state is 120 nm to 500 nm, preferably 150 to 270 nm.

The second shell (iv) comprises 85% to 99.9%, preferably 90% to 99.9% by weight, of at least one nonionically ethylenically unsaturated monomer, and 0.1% to 15% by weight, preferably 0.1% to 10% by weight, of at least one hydrophilic monoethylenically unsaturated monomer.

The nonionically ethylenically unsaturated monomers comprehend styrene, vinyltoluene, ethylene, butadiene, vinyl acetate, vinyl chloride, vinylidene chloride, acrylonitrile, acrylamide, methacrylamide, ($C_1$-$C_{20}$)alkyl or ($C_3$-$C_{20}$)alkenyl esters of acrylic or methacrylic acid, methyl acrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, monomers comprising hydroxyl groups, especially $C_1$-$C_{10}$ hydroxyalkyl (meth) acrylates, such as hydroxyethyl (meth)acrylate, hydroxypropyl (meth)acrylate, glycidyl (meth)acrylate, ricinoleic acid, palmitoleic acid, oleic acid, elaidinic acid, vaccenic acid, icosenoic acid, cetoleic acid, erucic acid, nervonic acid, linoleic acid, linolenic acid, arachidonic acid, timnodonic acid, and clupanodonic acid, preferably styrene, acrylonitrile, methacrylamide, methyl acrylate, methyl methacrylate, ethyl acrylate, ethyl methacrylate, butyl acrylate, butyl methacrylate, 2-ethylhexyl acrylate, and 2-ethylhexyl methacrylate.

The monoethylenically unsaturated hydrophilic monomers comprehend acrylic acid, methacrylic acid, acryloyloxypropionic acid, methacryloyloxypropionic acid, acryloyloxyacetic acid, methacryloyloxyacetic acid, crotonic acid, aconitic acid, itaconic acid, monomethyl maleate, maleic acid, monomethyl itaconate, maleic anhydride, fumaric acid, monomethyl fumarate, preferably acrylic acid, methacrylic acid, itaconic acid, itaconic anhydride, and itaconic acid monomethyl ester.

The first shell is ensheathed by the second shell and the weight ratio of the first shell (iii) to the second shell (iv) is 1:30 to 1:1, preferably 1:20 to 1:1, and the shell polymer possesses a glass transition temperature according to Fox of 50 to 120° C. The average particle size of this stage is 200 to 1500 nm, preferably 250 to 600 nm.

The plasticizer monomer listed under (v) comprehends, for example, α-methylstyrene, esters of 2-phenylacrylic acid/ atropic acid (e.g., methyl, ethyl, n-propyl, n-butyl), 2-methyl-2-butene, 2,3-dimethyl-2-butene, 1,1-diphenylethene or methyl 2-tert-butylacrylate, and also other monomers listed in J. Brandrup, E. H. Immergut, Polymer Handbook 3rd Edition, 11/316 ff. A preferred plasticizer monomer used is α-methyl-styrene.

The neutralizing listed under (vi) takes place with a base for swelling the core and hence forming the hollow particle. Examples of bases which can be used include alkali metal or alkaline earth metal compounds such as sodium hydroxide, potassium hydroxide, calcium hydroxide, magnesium oxide, sodium carbonate; ammonia; primary, secondary, and tertiary amines, such as ethylamine, propylamine, monoisopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminethylamine, 2,3-diaminopropane, 1,2-propylenediamine, dimethylaminopropylamine, neopentanediamine, hexamethylenediamine, 4,9-dioxadodecane-1,12-diamine, polyethyleneimine or polyvinylamine.

The third shell (vii) comprises 90% to 99.9%, preferably 90% to 99.9% by weight of at least one nonionically ethylenically unsaturated monomer, and 0.1% to 10%, preferably 0.1% to 5% by weight of at least one hydrophilic monoethylenically unsaturated monomer.

The nonionically ethylenically unsaturated monomers comprehend styrene, vinyltoluene, ethylene, butadiene, vinyl acetate, vinyl chloride, vinylidene chloride, acrylonitrile, acrylamide, methacrylamide, ($C_1$-$C_{20}$)alkyl or ($C_3$-$C_{20}$)alkenyl esters of acrylic or methacrylic acid, methyl acrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, monomers comprising hydroxyl groups, especially $C_1$-$C_{10}$ hydroxyalkyl (meth)acrylates, such as hydroxyethyl (meth)acrylate, hydroxypropyl (meth)acrylate, glycidyl (meth)acrylate, ricinoleic acid, palmitoleic acid, oleic acid, elaidinic acid, vaccenic acid, icosenoic acid, cetoleic acid, erucic acid, nervonic acid, linoleic acid, linolenic acid, arachidonic acid, timnodonic acid, and clupanodonic acid, preferably styrene, acrylonitrile, methacrylamide, methyl acrylate, methyl methacrylate, ethyl acrylate, ethyl methacrylate, butyl acrylate, butyl methacrylate, 2-ethylhexyl acrylate, and 2-ethylhexyl methacrylate.

The monoethylenically unsaturated hydrophilic monomers comprehend acrylic acid, methacrylic acid, acryloyloxypropionic acid, methacryloyloxypropionic acid, acryloyloxyacetic acid, methacryloyloxyacetic acid, crotonic acid, aconitic acid, itaconic acid, monomethyl maleate, maleic acid, monomethyl itaconate, maleic anhydride, fumaric acid, monomethyl fumarate, preferably acrylic acid, methacrylic acid, itaconic acid, itaconic anhydride, and itaconic acid monomethyl ester.

The third shell as well envelops the second shell and the weight ratio of the third shell to the second shell is 5:1 to 1:2, preferably 3:1 to 1:1, and the shell polymer possesses a glass transition temperature according to Fox of 50 to 120° C.

Where the inventively prepared polymers are used for painting, the average final particle size should be 300 to 800 nm; for application in papermaking and in cosmetology, 300 to 2500 nm; and for foams 300 to 800 nm.

In painting, the pigments employed, especially $TiO_2$, may be replaced completely or partly by the polymer dispersion described here. Typically such paints comprise, among other constituents, water, thickener, aqueous sodium hydroxide solution, pigment dispersant, associative thickener, defoamer, biocide, binder, and film-forming assistant.

The hollow particle dispersion can also for similar application in other coatings composed of resinous condensation products comprising phenolates and amino resins comprising urea-formaldehyde and melamine-formaldehyde or other condensates, e.g., water-dispersible alkyds.

Furthermore, it is possible for polymodal heteropolymers of the described invention, having a high fraction of large hollow particles and a smaller fraction of small hollow particles, not only to be used exclusively as a white pigment but also, as a result of the fraction of small hollow particles, to have adhesive properties as well. The use of the pigments in paper coatings leads to an increase in paper gloss. This can be attributed to the shell, which in contradistinction to what is the case with inorganic pigments is deformable under pressure. The printing quality of the paper as well is raised. Replacing inorganic pigments by the organic pigments described herein results in a lowering of the density of the coating and hence to more lightweight paper.

In cosmetics the pigments can be used, for example, in sun protection creams for reinforcing the photoprotection. As a result of the extraordinary light scattering properties, the probability of absorption of UV radiation by UV-active substances in the suncream is increased.

The polymers can be prepared by typical polymerization processes of emulsion polymerization. It is preferred to operate in the absence of oxygen, preferably in a stream of nitrogen. For the polymerization method the typical apparatus is used, examples being stirred tanks, stirred tank cascades, autoclaves, tube reactors, and kneading apparatus. The polymerization can be performed in solvents or diluents, such as toluene, o-xylene, p-xylene, cumene, chlorobenzene, ethylbenzene, technical mixtures of alkylaromatics, cyclohexane, technical aliphatics mixtures, acetone, cyclohexanone, tetrahydrofuran, dioxane, glycols and glycol derivatives, polyalkylene glycols and their derivatives, diethyl ether, tert-butyl methyl ether, methyl acetate, isopropanol, ethanol, water or mixtures such as isopropanol/water mixtures, for example.

The polymerization can be conducted at temperatures from 20 to 300° C., preferably from 50 to 200° C.

The polymerization is preferably conducted in the presence of compounds which form free radicals. These compounds are required in amounts of up to 30%, preferably 0.05% to 15%, more preferably 0.2% to 8% by weight, based on the monomers used in the polymerization. In the case of multicomponent initiator systems (redox initiator systems, for example) the above weight figures are based on the sum total of the components.

Examples of suitable polymerization initiators include peroxides, hydroperoxides, peroxodisulfates, percarbonates, peroxy esters, hydrogen peroxide, and azo compounds. Examples of initiators, which may be water-soluble or else water-insoluble, are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxodisulfate, azodiisobutyronitrile, 2,2'-azobis(2-amidinopropane) dihydrochloride, 2-(carbamoylazo)isobutyronitrile and 4,4-azobis(4-cyanovaleric acid).

The initiators can be employed alone or in a mixture with one another, examples being mixtures of hydrogen peroxide and sodium peroxodisulfate. For polymerization in an aqueous medium it is preferred to use water-soluble initiators.

It is equally possible to use the known redox initiator systems as polymerization initiators. Such redox initiator systems include at least one peroxide compound in combination with a redox coinitiator, examples being reducing sulfur compounds, such as bisulfites, sulfites, thiosulfates, dithionites and tetrathionates of alkali metals and ammonium compounds. For instance, combinations of peroxodisulfates with alkali metal or ammonium hydrogensulfites can be used, e.g., ammonium peroxodisulfate and ammonium disulfite. The amount of the peroxide compound relative to the redox coinitiator is 30:1 to 0.05:1.

In combination with the initiators or redox initiator systems it is possible in addition to use transition metal catalysts, examples being salts of iron, cobalt, nickel, copper, vanadium, and manganese. Examples of suitable salts include iron(II) sulfate, cobalt(II) chloride, nickel(II) sulfate, and copper(I) chloride. Based on monomers, the reducing transition metal salt is used at a concentration of from 0.1 to 1 000 ppm. For instance, combinations of hydrogen peroxide with iron(II) salts can be used, such as 0.5% to 30% of hydrogen peroxide and 0.1 to 500 ppm of Mohr's salt.

Polymerization in organic solvents, too, can be carried out using redox coinitiators and/or transition metal catalysts in combination with the abovementioned initiators, examples of such coinitiators and/or catalysts being benzoin, dimethylaniline, ascorbic acid, and organic-solvent-soluble complexes of heavy metals such as copper, cobalt, iron, manganese, nickel, and chromium. The amounts of redox coinitiators or transition metal catalysts normally used here are typically about 0.1 to 1 000 ppm, based on the amounts of monomers used.

If the polymerization of the reaction mixture is started at the lower limit of the suitable temperature range for the polymerization and subsequently completed at a higher temperature then it is advantageous to use at least two different initiators which decompose at different temperatures, so that a sufficient concentration of free radicals is available within each temperature interval.

The initiator can also be added in stages, or the rate of initiator addition can be varied over time.

To prepare polymers having a low average molecular weight it is frequently advantageous to conduct the copolymerization in the presence of regulators. For this purpose it is possible to use typical regulators, such as organic SH-containing compounds, such as 2-mercaptoethanol, 2-mercaptopropanol, mercaptoacetic acid, tert-butyl mercaptan, n-octyl mercaptan, n-dodecyl mercaptan and tert-dodecyl mercaptan, $C_1$ to $C_4$ aldehydes, such as formaldehyde, acetaldehyde, propionaldehyde, hydroxylammonium salts such as hydroxylammonium sulfate, formic acid, sodium bisulfite or hypophosphorous acid or the salts thereof, or isopropanol. The polymerization regulators are generally used in amounts of 0.1% to 20% by weight, based on the monomers. The average molecular weight can also be influenced by the choice of appropriate solvent. For instance, polymerization in the presence of diluents containing benzylic hydrogen atoms, or in the presence of secondary alcohols such as isopropanol, for example, leads to a reduction in the average molecular weight, as a result of chain transfer.

Polymers of low or lower molecular weight are also obtained by varying the temperature and/or the concentration of initiator, and/or the feed rate of the monomers.

In order to prepare higher molecular mass copolymers it is frequently advantageous to operate the polymerization in the presence of crosslinkers. Such crosslinkers are compounds having two or more ethylenically unsaturated groups, such as, for example, diacrylates or dimethacrylates of at least dihydric saturated alcohols, such as ethylene glycol diacrylate, ethylene glycol dimethacrylate, 1,2-propylene glycol diacrylate, 1,2-propylene glycol dimethacrylate, butane-1,4-diol diacrylate, butane-1,4-diol dimethacrylate, hexanediol diacrylate, hexanediol dimethacrylate, neopentyl glycol diacrylate, neopentyl glycol dimethacrylate, 3-methylpentanediol diacrylate and 3-methylpentanediol dimethacrylate. The acrylic and methacrylic esters of alcohols having more than 2 OH groups can also be used as crosslinkers, e.g., trimethylolpropane triacrylate or trimethylolpropane trimethacrylate. A further class of crosslinkers are diacrylates or dimethacrylates of polyethylene glycols or polypropylene glycols having molecular weights of 200 to 9 000 in each case. Polyethylene glycols and polypropylene glycols used for preparing the diacrylates or dimethacrylates preferably have a molecular weight of 400 to 2 000 in each case. As well as the homopolymers of ethylene oxide and/or propylene oxide it is also possible to use block copolymers of ethylene oxide and propylene oxide or copolymers of ethylene oxide and propylene oxide containing the ethylene and propylene oxide units in random distribution. The oligomers of ethylene oxide and/or propylene oxide are suitable as well for preparing the crosslinkers, e.g., diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Suitable crosslinkers further include vinyl acrylate, vinyl methacrylate, vinyl itaconate, divinyl adipate, butanediol divinyl ether, trimethylolpropane trivinyl ether, allyl acrylate, allyl methacrylate, pentaerythritol triallyl ether, triallylsucrose, pentaallylsucrose, pentaallylsaccharose, methylenebis(meth)acrylamide, divinylethyleneurea, divinylpropyleneurea, divinylbenzene, divinyldioxane, triallylcyanurate, tetraallylsilane, tetravinylsilane, and bis- or polyacryloylsiloxanes (e.g., Tegomers® from Th. Goldschmidt AG).

The crosslinkers are used preferably in amounts of 0.1% to 30% by weight, based on the monomers to be polymerized, or on the monomers of one stage that are to be polymerized. The crosslinkers can be added in any stage.

It may further be advantageous to stabilize the polymer droplets or polymer particles by means of surface-active auxiliaries. Typically emulsifiers or protective colloids are used for this purpose. Suitable emulsifiers include anionic, nonionic, cationic, and amphoteric emulsifiers. Examples of anionic emulsifiers are alkylbenzenesulfonic acids, sulfonated fatty acids, sulfosuccinates, fatty alcohol sulfates, alkylphenol sulfates, and fatty alcohol ether sulfates. Examples of nonionic emulsifiers that can be used include alkylphenol ethoxylates, primary alcohol ethoxylates, fatty acid ethoxylates, alkanolamide ethoxylates, fatty amine ethoxylates, EO/PO block copolymers, and alkylpolyglucosides. Examples of cationic and amphoteric emulsifiers used include quaternized amine alkoxylates, alkylbetaines, alkylamidobetaines, and sulfobetaines.

Examples of typical protective colloids include cellulose derivatives, polyethylene glycol, polypropylene glycol, copolymers of ethylene glycol and propylene glycol, polyvinyl acetate, polyvinyl alcohol, polyvinyl ethers, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline, and maleic acid or maleic anhydride copolymers, as described in DE 2 501 123, for example.

The emulsifiers or protective colloids are customarily used in concentrations of 0.05% to 20% by weight, based on the monomers.

If polymerization is carried out in aqueous solution or dilution then the monomers can be wholly or partly neutralized with bases prior to or during the polymerization. Examples of suitable bases include alkali metal and alkaline earth metal compounds such as sodium hydroxide, potassium hydroxide, calcium hydroxide, magnesium oxide, sodium carbonate; ammonia; primary, secondary, and tertiary amines, such as ethylamine, propylamine, monoisopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine or morpholine.

Neutralizing can also be effected using polybasic amines, such as ethylenediamine, 2-diethylaminoethylamine, 2,3-diaminopropane, 1,2-propylenediamine, dimethylaminopropylamine, neopentanediamine, hexamethylenediamine, 4,9-dioxadodecane-1,12-diamine, polyethyleneimine or polyvinylamine, for example.

For partial or complete neutralizing of the ethylenically unsaturated carboxylic acids before or during the polymerization it is preferred to use ammonia, triethanolamine, and diethanolamine.

With particular preference the ethylenically unsaturated carboxylic acids are not neutralized prior to and during the polymerization. The polymerization can be conducted continuously or batchwise in accordance with a multiplicity of variants. It is customary to introduce a fraction of the monomers as an initial charge, where appropriate in a suitable diluent or solvent and where appropriate in the presence of an emulsifier, protective colloid or further auxiliaries, to render the atmosphere inert, and to raise the temperature until the desired polymerization temperature is reached. However, the initial charge may also be a suitable diluent alone. The free-radical initiator, further monomers, and other auxiliaries, such as regulators or crosslinkers, for example, each in a diluent, if necessary, are metered in over a defined period of time. The feed times may differ in length. For example, the initiator feed may be run in over a longer time than that chosen for the monomer feed.

If the polymer is prepared in a steam-volatile solvent or solvent mixture, the solvent can be separated off by introducing steam, in order thus to obtain an aqueous solution or dispersion. The polymer can also be separated from the organic diluent by means of a drying operation.

Experimental Methods
Determination of Glass Transition Temperature

The glass transition temperatures were determined by theoretical calculation using the Fox equation (John Wiley & Sons Ltd., Baffins Lane, Chichester, England, 1997).

$$1/T_g = W_a/T_{ga} + W_b/T_{gb}, \text{ where}$$

$T_{ga}$ and $T_{gb}$=glass transition temperature of polymer "a" and "b"

$W_a$ and $W_b$=weight fraction of polymer "a" and "b"

Measurement of Particle Size

The particle sizes were determined using a Coulter M4+ (Particle Analyzer) or by means of photon correlation spectroscopy, also known as quasielastic light scattering or dynamic light scattering (ISO 13321 standard) using an HPPS (High Performance Particle Sizer) from Malvern, or by means of hydrodynamic fractionation using a PSDA (Particle Size Distribution Analyzer) from Polymer Labs.

Procedure for Measuring the Whiteness 6 g of the color paste described below and 1 g of the approximately 30% dispersion of hollow particles are weighed out into a vessel and the mixture is homogenized without stirred incorporation of air. A film of this mixture is drawn down using a 200 μm doctor blade at a rate of 0.9 cm/sec onto a black plastic film (matte finish, Article No. 13.41 EG 870934001, Bernd Schwegmann GmbH & Co. KG, D). The samples are dried at 23° C. and a relative humidity of 40-50% for 24 h. Subsequently the whiteness is measured in three different places using a Minolta CM-508i spectrophotometer. The measurement points are marked in order to allow subsequent measurement, using a micrometer screw, of the corresponding thicknesses of the paint film by differential measurement relative to the uncoated plastic film. Following calculation of an average film thickness and also of an average whiteness from the three individual measurements, the resulting whiteness is, finally, standardized to a dry film thickness of 50 μm by means of linear extrapolation. The calibration required for this purpose was carried out by measuring the whiteness of a standard hollow particle dispersion in a dry film thickness range of approximately 30-60 μm.

EXAMPLES

Preparation of Color Paste

A) A vessel is charged with 240 g of water, after which the following ingredients are added in the stated order, with a dissolver running at about 1000 rpm, and the mixture is stirred for a total of about 15 minutes until homogeneous: 2.5 g of Natrosol® 250 HR (hydroxyethylcellulose thickener from Hercules GmbH), 1 g of 10% strength sodium hydroxide solution, 6 g of Pigmentverteiler® MD 20 (pigment-dispersing copolymer of maleic acid and diisobutylene from BASF AG), 10 g of Collacral® LR 8990 (polyurethane associative thickener from BASF AG), 3 g of Agitan® E 255 (siloxane defoamer from Münzing Chemie GmbH), 2 g of Proxel® BD 20 (biocide from Avecia Inc.), 370 g of Acronal® A 684 (binder, 50% dispersion from BASF AG), 20 g of Texanol® (film-forming assistant from Eastman Chemical Company), 2 g of Agitan® E 255 (siloxane defoamer from Münzing Chemie GmbH), and 10 g of 5% strength Collacral LR 8989) (polyurethane associative thickener from BASF AG.

B) A vessel is charged with 250 g of water, after which the following ingredients are added in the stated order, with a dissolver running at about 1000 rpm, and the mixture is stirred for a total of about 15 minutes until homogeneous: 2.5 g of Natrosol® 250 HR (hydroxyethylcellulose thickener from Hercules GmbH), 1 g of 10% strength sodium hydroxide solution, 6 g of Pigmentverteiler® MD 20 (pigment-dispersing copolymer of maleic acid and diisobutylene from BASF AG), 10 g of Collacral® LR 8990 (polyurethane associative thickener from BASF AG), 3 g of Agitan® E 255 (siloxane defoamer from Münzing Chemie GmbH), 2 g of Proxel® BD 20 (biocide from Avecia Inc.), 203 g of Kronos 2300, 370 g of Acronal® A 684 (binder, 50% dispersion from BASF AG), 20 g of Texanol® (film-forming assistant from Eastman Chemical Company), 2 g of Agitan® E 255 (siloxane defoamer from Münzing Chemie GmbH), 10 g of 5% strength Collacral LR 8989 (polyurethane associative thickener from BASF AG), and 116 g of hollow particle dispersion.

Dispersion A (Seed)

From 230 g of water, 2.17 g of arylsulfonate (15% strength), 338 g of n-butyl acrylate, 303.6 g of methyl methacrylate and 8.45 g of methacrylic acid a preemulsion was prepared. The initial charge, consisting of 2356 g of water, 32.0 g of arylsulfonate (15% strength) and 41.2 g of the preemulsion, was heated to a temperature of 80° C. under a nitrogen atmosphere in a polymerization vessel equipped with an anchor stirrer, reflux condenser and two feed vessels and, following the addition of 14 g of a 22.4% strength solution of ammonium persulfate, polymerization was commenced for 15 minutes. Then the remainder of the preemulsion was metered in over the course of 60 minutes at 80° C. Subsequently polymerization was continued for 15 minutes and the reaction mixture then cooled to 55° C. over the course of 20 minutes. For depletion of residual monomers 6.5 g of a 10% strength solution of tert-butyl hydroperoxide and 8.1 g of a 5% strength solution of Rongalit C were then added to the reaction mixture, and after cooling to 30° C. the pH of the dispersion was adjusted by addition of 8.1 g of 25% strength ammonia solution.
Solids content: 19.7%
pH: 2.6
Particle size (AUC, D50): 47 nm
Dispersion B1 (Swell Core)

The initial charge, consisting of 1455 g of water and 63.2 g of dispersion A, was heated to a temperature of 79° C. under a nitrogen atmosphere in a polymerization vessel equipped with an anchor stirrer, reflux condenser and two feed vessels and, following the addition of 10 g of a 2.5% strength solution of sodium persulfate, polymerization was commenced for 5 minutes. Then preemulsion 1, consisting of 262 g of water, 3.33 g of arylsulfonate (15% strength), 20.75 g of Lutensit A-EP (acid form, 20% strength), 186.6 g of methyl methacrylate and 124.4 g of methacrylic acid, was metered in over the course of 113 minutes at 79° C. Subsequently preemulsion 2, consisting of 254 g of water, 2.67 g of arylsulfonate (15% strength), 187 g of methyl methacrylate and 2.05 g of methacrylic acid was metered in together with 22 g of a 2.5% strength solution of sodium persulfate over the course of 67 minutes at 79° C. Finally polymerization was continued for 30 minutes.
Solids content: 19.9%
pH: 2.5.
Particle size (Autosizer): 195 nm
Dispersion B2 (Swell Core)

The initial charge, consisting of 1455 g of water and 42.0 g of dispersion A, was heated to a temperature of 79° C. under a nitrogen atmosphere in a polymerization vessel equipped with an anchor stirrer, reflux condenser and two feed vessels and, following the addition of 10 g of a 2.5% strength solution of sodium persulfate, polymerization was commenced for 5 minutes. Then preemulsion 1, consisting of 262 g of water, 3.33 g of arylsulfonate (15% strength), 20.75 g of Lutensit A-EP (acid form, 20% strength), 211.8 g of methyl methacrylate and 104.3 g of methacrylic acid, was metered in over the course of 113 minutes at 79° C. Subsequently preemulsion 2, consisting of 254 g of water, 2.67 g of arylsulfonate (15% strength), 186 g of methyl methacrylate and 2.05 g of methacrylic acid was metered in together with 22 g of a 2.5% strength solution of sodium persulfate over the course of 67 minutes at 79° C. Finally polymerization was continued for 30 minutes.
Solids content: 19.7%
pH: 2.9.
Particle size (Autosizer): 211 nm
Dispersion B3 (Swell Core)

The initial charge, consisting of 1009 g of water and 28.7 g of Acronal A 508, was heated to a temperature of 82° C. under a nitrogen atmosphere in a polymerization vessel equipped with an anchor stirrer, reflux condenser and two feed vessels and, following the addition of 20.2 g of a 2.5% strength solution of sodium persulfate, polymerization was commenced for 5 minutes. Then preemulsion 1, consisting of 163 g of water, 2.24 g of arylsulfonate (15% strength), 13.95 g of Lutensit A-EPA (partly neutralized, 20% strength), 124.9 g of methyl methacrylate, 83.6 g of methacrylic acid and 0.50 g of allyl methacrylate, was metered in over the course of 70 minutes at 82° C. After the end of the feed, 3.0 g of a 2.5% strength solution of sodium persulfate were added and the mixture was stirred for 5 minutes. Subsequently preemulsion 2, consisting of 171 g of water, 1.79 g of arylsulfonate (15% strength), 112 g of methyl methacrylate and 13.8 g of n-butyl acrylate and 1.38 g of methacrylic acid was metered in together with 12 g of a 2.5% strength solution of sodium persulfate over the course of 70 minutes at 82° C. Finally polymerization was continued for 30 minutes.
Solids content: 19.8%
pH: 4.4.
Particle size (Autosizer): 207 nm
Dispersion B4 (Swell Core)

The initial charge, consisting of 1542 g of water and 44.2 g of dispersion A, was heated to a temperature of 82° C. under a nitrogen atmosphere in a polymerization vessel equipped with an anchor stirrer, reflux condenser and two feed vessels and, following the addition of 10.6 g of a 2.5% strength solution of sodium persulfate, polymerization was commenced for 5 minutes. Then preemulsion 1, consisting of 277 g of water, 3.53 g of arylsulfonate (15% strength), 22.00 g of Lutensit A-EP (acid form, 20% strength), 222.6 g of methyl methacrylate and 109.7 g of methacrylic acid, was metered in over the course of 113 minutes, during which the polymerization temperature was lowered continuously from 82° C. to 80° C. Subsequently preemulsion 2, consisting of 269 g of water, 2.83 g of arylsulfonate (15% strength), 196 g of methyl methacrylate and 2.17 g of methacrylic acid was metered in together with 23 g of a 2.5% strength solution of sodium persulfate over the course of 67 minutes at 80° C. Finally polymerization was continued for 30 minutes.
Solids content: 19.7%
pH: 2.7.
Particle size (Autosizer): 215 nm
Dispersion B5 (Swell Core)

The initial charge, consisting of 1009 g of water and 28.7 g of Acronal A 508, was heated to a temperature of 82° C. under a nitrogen atmosphere in a polymerization vessel equipped with an anchor stirrer, reflux condenser and two feed vessels and, following the addition of 20.2 g of a 2.5% strength solution of sodium persulfate, polymerization was commenced for 5 minutes. Then preemulsion 1, consisting of 163 g of water, 2.24 g of arylsulfonate (15% strength), 13.95 g of Lutensit A-EPA (partly neutralized, 20% strength), 125.0 g of methyl methacrylate, 83.6 g of methacrylic acid and 0.34 g of allyl methacrylate, was metered in over the course of 70 minutes at 82° C. After the end of the feed, 3.0 g of a 2.5% strength solution of sodium persulfate were added and the mixture was stirred for 5 minutes. Subsequently preemulsion 2, consisting of 171 g of water, 1.79 g of arylsulfonate (15% strength), 112 g of methyl methacrylate and 13.8 g of n-butyl acrylate and 1.38 g of methacrylic acid was metered in together with 12 g of a 2.5% strength solution of sodium persulfate over the course of 70 minutes at 82° C. Finally polymerization was continued for 30 minutes.
Solids content: 19.8%
pH: 4.4.
Particle size (Autosizer): 220 nm
Dispersion B6 (Swell Core)

The initial charge, consisting of 1613 g of water and 45.2 g of Acronal A 508, was heated to a temperature of 82° C. under a nitrogen atmosphere in a polymerization vessel equipped with an anchor stirrer, reflux condenser and two feed vessels and, following the addition of 10.6 g of a 2.5% strength solution of sodium persulfate, polymerization was commenced for 5 minutes. Then preemulsion 1, consisting of 127 g of water, 1.77 g of arylsulfonate (15% strength), 11.13 g of Lutensit A-EPA (partly neutralized, 20% strength), 99.1 g of methyl methacrylate and 65.7 g of methacrylic acid, was metered in over the course of 70 minutes at 82° C. At the same time preemulsion 2, consisting of 127 g of water, 1.77 g of arylsulfonate (15% strength), 11.13 g of Lutensit A-EPA (partly neutralized, 20% strength), 110.1 g of methyl methacrylate, 54.2 g of methacrylic acid and 0.53 g of allyl methacrylate, was metered over the course of 70 minutes into preemulsion 1 (power feed mode). After the end of the feeds, 4.7 g of a 2.5% strength solution of sodium persulfate were added and the mixture was stirred for 5 minutes. Subsequently preemulsion 3, consisting of 269 g of water, 2.83 g of arylsulfonate (15% strength), 176 g of methyl methacrylate and 21.7 g of n-butyl acrylate and 2.17 g of methacrylic acid was metered in together with 19 g of a 2.5% strength solution of sodium persulfate over the course of 70 minutes at 82° C. Finally polymerization was continued for 30 minutes.

Solids content: 19.8% pH: 4.3

Particle size (Autosizer): 210 nm

Dispersion B7 (Swell Core)

The initial charge, consisting of 1589 g of water and 45.2 g of Acronal A 508, was heated to a temperature of 82° C. under a nitrogen atmosphere in a polymerization vessel equipped with an anchor stirrer, reflux condenser and two feed vessels and, following the addition of 10.6 g of a 2.5% strength solution of sodium persulfate, polymerization was commenced for 5 minutes. Then preemulsion 1, consisting of 277 g of water, 3.53 g of arylsulfonate (15% strength), 22.00 g of Lutensit A-EPA (partly neutralized, 20% strength), 222.1 g of methyl methacrylate, 109.7 g of methacrylic acid and 0.53 g of allyl methacrylate, was metered in over the course of 70 minutes at 82° C. After the end of the feed, 4.7 g of a 2.5% strength solution of sodium persulfate were added and the mixture was stirred for 5 minutes. Subsequently preemulsion 2, consisting of 269 g of water, 2.83 g of arylsulfonate (15% strength), 196 g of methyl methacrylate and 2.17 g of methacrylic acid was metered in together with 23 g of a 2.5% strength solution of sodium persulfate over the course of 70 minutes at 82° C. Finally polymerization was continued for 30 minutes.

Solids content: 19.7% pH: 4.8.

Particle size (Autosizer): 209 nm

Dispersion B8 (Swell Core)

The initial charge, consisting of 986 g of water and 28.2 g of Acronal A 508, was heated to a temperature of 82° C. under a nitrogen atmosphere in a polymerization vessel equipped with an anchor stirrer, reflux condenser and two feed vessels and, following the addition of 20.9 g of a 2.5% strength solution of sodium persulfate, polymerization was commenced for 5 minutes. Then preemulsion 1, consisting of 161 g of water, 2.20 g of arylsulfonate (15% strength), 13.70 g of Lutensit A-EPA (partly neutralized, 20% strength), 0.07 g of tert-dodecyl mercaptan, 136.3 g of methyl methacrylate, 0.66 g of allyl methacrylate 68.3 g of methacrylic acid, was metered in over the course of 70 minutes at 82° C. After the end of the feed, 2.9 g of a 2.5% strength solution of sodium persulfate were added and the mixture was stirred for 5 minutes. Subsequently preemulsion 2, consisting of 167 g of water, 1.76 g of arylsulfonate (15% strength), 110 g of methyl methacrylate, 13.5 g of n-butyl acrylate and 1.35 g of methacrylic acid, was metered in together with 12 g of a 2.5% strength solution of sodium persulfate over the course of 70 minutes at 82° C. Finally polymerization was continued for 30 minutes.

Solids content: 19.7% pH: 4.3.

Particle size (Autosizer): 213 nm

Comparative Experiments:

Dispersion C1:

The initial charge, consisting of 513 g of water and 158.3 g of dispersion B1, was heated to a temperature of 80° C. under a nitrogen atmosphere in a polymerization vessel equipped with an anchor stirrer, reflux condenser and two feed vessels and, following addition of 14.4 g of a 2.5% strength solution of sodium persulfate, polymerization was commenced for 5 minutes. Then preemulsion 1, consisting of 158 g of water, 6.6 g of arylsulfonate (15% strength), 11.3 g of methacrylic acid and 180 g of styrene, was metered in together with 18.3 g of a 2.5% strength solution of sodium persulfate over the course of 80 minutes at 80° C.; toward the end of the feed the internal temperature was raised to 92° C. and the sodium persulfate feed was stopped. After the end of the emulsion feed preemulsion 2, consisting of 16 g of water, 0.6 g of arylsulfonate (15% strength) and 15.8 g of α-methylstyrene, was added and the mixture was stirred for 5 minutes, followed by the addition of 30 g of 10% strength aqueous ammonia; the reaction mixture was stirred at 92° C. for a further 15 minutes. Subsequently 4.0 g of a 2.5% strength solution of sodium persulfate were metered in over the course of 3 minutes. Preemulsion 3, consisting of 210 g of water, 7.5 g of arylsulfonate (15% strength), 22.5 g of methyl methacrylate and 221 g of styrene, was metered in together with 27.4 g of a 2.5% strength solution of sodium persulfate over the course of 100 minutes at 92° C. Finally polymerization was continued for 30 minutes. Residual monomers were reduced by a final chemical deodorization. For this purpose 13.5 g of a 10% strength solution of tert-butyl hydroperoxide and 13.5 g of a 10% strength solution of ascorbic acid were metered in parallel into the reaction mixture over the course of 60 minutes at 92° C.

Solids content: 29.9% pH: 7.6

Dispersion C1C

Synthesis was as for the preparation of dispersion C1, with the difference that, instead of α-methylstyrene, preemulsion 2 comprised the same amount of methyl methacrylate.

Solids content: 29.5% pH: 8.8

Dispersion C2C

Synthesis was as for the preparation of dispersion C1, with the difference that, instead of α-methylstyrene, preemulsion 2 comprised the same amount of styrene.

Solids content: 29.5% pH: 8.9

Dispersion C3C

Synthesis was as for the preparation of dispersion C1, with the difference that, instead of α-methylstyrene, preemulsion 2 comprised the same amount of styrene and also 0.45 g of Irganox HP 2215 (inhibitor from Ciba Specialty Chemicals).

Solids content: 29.2% pH: 8.5

TABLE 1

Summary of results:

| Experiment | C1 | C1C | C2C | C3C |
|---|---|---|---|---|
| Residual monomer [ppm]: | | | | |
| before pH | 16000 | 2000 | 3500 | 06400 |
| after pH | 13000 | 0800 | 3100 | 03300 |
| after 5 min PE3 | 04700 | 0500 | 5800 | 17900 |
| Particle size [nm]: | | | | |
| before pH | 00385 | 0377 | 0377 | n.d. |
| after pH | 00438 | 0400 | 0422 | n.d. |
| after 5 min PE3 | 00451 | 0455 | 0443 | n.d. |
| Whiteness: | | | | |
| Final sample | 00069 | 0049 | 0054 | 00056 |

As is readily apparent from the above table, only sample C1 exhibits ideal behavior and delivers by far the highest whiteness. C1 shows an ideal profile of residual monomers during the swelling process, i.e., maximum at the moment of ammonia addition without significant drop, and marked reduction following addition of preemulsion 3. In contrast to the ideal behavior just described, methyl methacrylate and styrene as swelling monomers are very quickly broken down (C1C+C2C), and even adding inhibitor is unable to prevent this (C3C). The inhibitor, instead, has a disastrous effect on the subsequent ongoing polymerization following addition of preemulsion 3. This control of the swelling kinetics is also reflected in the profile of the particle size increase. Only in the case of C1 does the principal expansion occur at the desired moment, i.e., directly after pH adjustment. In the other cases the particle continues to exhibit marked growth even during polymerization of the stabilizing shell, which evidently results in a poorer whiteness.

Further inventive hollow particle dispersions:
Dispersion C2a:

The initial charge, consisting of 501 g of water and 152.0 g of dispersion B2, was heated to a temperature of 80° C. under a nitrogen atmosphere in a polymerization vessel equipped with an anchor stirrer, reflux condenser and two feed vessels and, following addition of 14.4 g of a 2.5% strength solution of sodium persulfate, polymerization was commenced for 5 minutes. Then preemulsion 1, consisting of 158 g of water, 6.6 g of arylsulfonate (15% strength), 9.7 g of methacrylic acid and 155 g of styrene, was metered in together with 16.7 g of a 2.5% strength solution of sodium persulfate over the course of 80 minutes at 80° C.; toward the end of the feed the internal temperature was raised to 92° C. and the sodium persulfate feed was stopped. After the end of the emulsion feed preemulsion 2, consisting of 16 g of water, 0.6 g of arylsulfonate (15% strength) and 13.5 g of α-methylstyrene, was added and the mixture was stirred for 5 minutes, followed by the addition of 26 g of 10% strength aqueous ammonia; the reaction mixture was stirred at 92° C. for a further 15 minutes. Subsequently 4.0 g of a 2.5% strength solution of sodium persulfate were metered in over the course of 3 minutes. Preemulsion 3, consisting of 229 g of water, 7.5 g of arylsulfonate (15% strength), 25.2 g of methyl methacrylate and 247 g of styrene, was metered in together with 29.0 g of a 2.5% strength solution of sodium persulfate over the course of 100 minutes at 92° C. Finally polymerization was continued for 30 minutes. Residual monomers were reduced by a final chemical deodorization. For this purpose 13.5 g of a 10% strength solution of tert-butyl hydroperoxide and 13.5 g of a 10% strength solution of ascorbic acid were metered in parallel into the reaction mixture over the course of 60 minutes at 92° C.

Solids content: 28.5%
pH: 8.7
Particle size (Autosizer): 731 nm (0.13 polydispersity)
Whiteness: 74

Dispersion C2b:

The initial charge, consisting of 486 g of water and 174.7 g of dispersion B2, was heated to a temperature of 80° C. under a nitrogen atmosphere in a polymerization vessel equipped with an anchor stirrer, reflux condenser and two feed vessels and, following addition of 14.4 g of a 2.5% strength solution of sodium persulfate, polymerization was commenced for 5 minutes. Then preemulsion 1, consisting of 179 g of water, 7.5 g of arylsulfonate (15% strength), 11.0 g of methacrylic acid and 176 g of styrene, was metered in together with 18.9 g of a 2.5% strength solution of sodium persulfate over the course of 90 minutes at 80° C.; toward the end of the feed the internal temperature was raised to 92° C. and the sodium persulfate feed was stopped. After the end of the emulsion feed preemulsion 2, consisting of 16 g of water, 0.6 g of arylsulfonate (15% strength) and 15.3 g of α-methylstyrene, was added and the mixture was stirred for 5 minutes, followed by the addition of 29 g of 10% strength aqueous ammonia; the reaction mixture was stirred at 92° C. for a further 15 minutes. Subsequently 4.0 g of a 2.5% strength solution of sodium persulfate were metered in over the course of 3 minutes. Preemulsion 3, consisting of 207 g of water, 6.6 g of arylsulfonate (15% strength), 22.7 g of methyl methacrylate and 225 g of styrene, was metered in together with 26.7 g of a 2.5% strength solution of sodium persulfate over the course of 90 minutes at 92° C. Finally polymerization was continued for 30 minutes. Residual monomers were reduced by a final chemical deodorization. For this purpose 13.5 g of a 10% strength solution of tert-butyl hydroperoxide and 13.5 g of a 10% strength solution of ascorbic acid were metered in parallel into the reaction mixture over the course of 60 minutes at 92° C.

Solids content: 29.3%
pH: 8.7
Particle size (Autosizer): 719 nm (0.18 PD)
Whiteness: 70

Dispersion C3:

The initial charge, consisting of 486 g of water and 181.2 g of dispersion B3, was heated to a temperature of 82° C. under a nitrogen atmosphere in a polymerization vessel equipped with an anchor stirrer, reflux condenser and two feed vessels and, following addition of 14.4 g of a 2.5% strength solution of sodium persulfate, polymerization was commenced for 5 minutes. Then preemulsion 1, consisting of 179 g of water, 7.5 g of arylsulfonate (15% strength), 11.0 g of methacrylic acid and 176 g of styrene, was metered in together with 18.9 g of a 2.5% strength solution of sodium persulfate over the course of 90 minutes at 82° C. After the end of both feeds, the internal temperature was raised to 92° C. over the course of 30 minutes and then preemulsion 2, consisting of 16 g of water, 0.6 g of arylsulfonate (15% strength) and 15.3 g of α-methylstyrene, was added and the mixture was stirred for 5 minutes, followed by the addition of 29 g of 10% strength aqueous ammonia; the reaction mixture was stirred at 92° C. for a further 15 minutes. Subsequently 4.0 g of a 2.5% strength solution of sodium persulfate were metered in over the course of 3 minutes. Preemulsion 3, consisting of 177 g of water, 6.6 g of arylsulfonate (15% strength), 22.7 g of methyl methacrylate and 223 g of styrene, was metered in together with 26.7 g of a 2.5% strength solution of sodium persulfate over the course of 115 minutes at 92° C. After a feed time of 55 minutes, 32.1 g of 7% strength itaconic acid were added to preemulsion 3. Finally polymerization was continued for 30 minutes. Residual monomers were reduced by a final chemical deodorization. For this purpose 13.5 g of a 10% strength solution of tert-butyl hydroperoxide and 13.5 g of a 10% strength solution of ascorbic acid were metered in parallel into the reaction mixture over the course of 60 minutes at 92° C.
Solids content: 29.1%
pH: 7.0
Particle size (Autosizer): 519 nm (0.09 PD)
Whiteness: 73
Dispersion C4:

The initial charge, consisting of 431 g of water and 155.3 g of dispersion B4, was heated to a temperature of 80° C. under a nitrogen atmosphere in a polymerization vessel equipped with an anchor stirrer, reflux condenser and two feed vessels and, following addition of 12.8 g of a 2.5% strength solution of sodium persulfate, polymerization was commenced for 5 minutes. Then preemulsion 1, consisting of 159 g of water, 6.7 g of arylsulfonate (15% strength), 9.8 g of methacrylic acid and 156 g of styrene, was metered in together with 16.8 g of a 2.5% strength solution of sodium persulfate over the course of 90 minutes at 80° C.; toward the end of the feed the internal temperature was raised to 92° C. and the sodium persulfate feed was stopped. After the end of the emulsion feed preemulsion 2, consisting of 14 g of water, 0.5 g of arylsulfonate (15% strength) and 13.6 g of α-methylstyrene, was added and the mixture was stirred for 5 minutes, followed by the addition of 26 g of 10% strength aqueous ammonia; the reaction mixture was stirred at 92° C. for a further 15 minutes.

Subsequently 3.6 g of a 2.5% strength solution of sodium persulfate were metered in over the course of 3 minutes. Preemulsion 3, consisting of 158 g of water, 5.9 g of arylsulfonate (15% strength), 20.2 g of methyl methacrylate and 198 g of styrene, was metered in together with 23.7 g of a 2.5% strength solution of sodium persulfate over the course of 90 minutes at 92° C. After a feed time of 45 minutes 28.6 g of 7% strength itaconic acid were added to preemulsion 3. Finally polymerization was continued for 30 minutes. Residual monomers were reduced by a final chemical deodorization. For this purpose 12.0 g of a 10% strength solution of tert-butyl hydroperoxide and 12.0 g of a 10% strength solution of ascorbic acid were metered in parallel into the reaction mixture over the course of 60 minutes at 92° C.
Solids content: 28.8%
pH: 8.0
Particle size (Autosizer): not measurable
Whiteness: 72
Dispersion C5:

The initial charge, consisting of 458 g of water and 154.5 g of dispersion B5, was heated to a temperature of 82° C. under a nitrogen atmosphere in a polymerization vessel equipped with an anchor stirrer, reflux condenser and two feed vessels and, following addition of 12.8 g of a 2.5% strength solution of sodium persulfate, polymerization was commenced for 5 minutes. Then preemulsion 1, consisting of 159 g of water, 6.7 g of arylsulfonate (15% strength), 9.8 g of methacrylic acid and 156 g of styrene, was metered in together with 16.8 g of a 2.5% strength solution of sodium persulfate over the course of 90 minutes at 82° C. After the end of both feeds, the internal temperature was raised to 92° C. over the course of 30 minutes and then preemulsion 2, consisting of 14 g of water, 0.5 g of arylsulfonate (15% strength) and 13.6 g of α-methylstyrene, was added and the mixture was stirred for 5 minutes, followed by the addition of 26 g of 10% strength aqueous ammonia; the reaction mixture was stirred at 92° C. for a further 15 minutes. Subsequently 3.6 g of a 2.5% strength solution of sodium persulfate were metered in over the course of 3 minutes. Preemulsion 3, consisting of 157 g of water, 5.9 g of arylsulfonate (15% strength), 20.2 g of methyl methacrylate and 198 g of styrene, was metered in together with 23.7 g of a 2.5% strength solution of sodium persulfate over the course of 100 minutes at 92° C. Finally polymerization was continued for 30 minutes. Residual monomers were reduced by a final chemical deodorization. For this purpose 12.0 g of a 10% strength solution of tert-butyl hydroperoxide and 12.0 g of a 10% strength solution of ascorbic acid were metered in parallel into the reaction mixture over the course of 60 minutes at 92° C.
Solids content: 28.9%
pH: 8.3
Particle size (Autosizer): 571 nm (0.06 PD)
Whiteness: 78
Dispersion C6:

The initial charge, consisting of 458 g of water and 154.5 g of dispersion B6, was heated to a temperature of 82° C. under a nitrogen atmosphere in a polymerization vessel equipped with an anchor stirrer, reflux condenser and two feed vessels and, following addition of 12.8 g of a 2.5% strength solution of sodium persulfate, polymerization was commenced for 5 minutes. Then preemulsion 1, consisting of 159 g of water, 6.7 g of arylsulfonate (15% strength), 9.8 g of methacrylic acid and 156 g of styrene, was metered in together with 16.8 g of a 2.5% strength solution of sodium persulfate over the course of 90 minutes at 82° C. After the end of both feeds, the internal temperature was raised to 92° C. over the course of 30 minutes and then preemulsion 2, consisting of 14 g of water, 0.5 g of arylsulfonate (15% strength) and 13.6 g of α-methylstyrene, was added and the mixture was stirred for 5 minutes, followed by the addition of 26 g of 10% strength aqueous ammonia; the reaction mixture was stirred at 92° C. for a further 15 minutes. Subsequently 3.6 g of a 2.5% strength solution of sodium persulfate were metered in over the course of 3 minutes. Preemulsion 3, consisting of 157 g of water, 5.9 g of arylsulfonate (15% strength), 20.2 g of methyl methacrylate and 198 g of styrene, was metered in together with 23.7 g of a 2.5% strength solution of sodium persulfate over the course of 100 minutes at 92° C. Finally polymerization was continued for 30 minutes. Residual monomers were reduced by a final chemical deodorization. For this purpose 12.0 g of a 10% strength solution of tert-butyl hydroperoxide and 12.0 g of a 10% strength solution of ascorbic acid were metered in parallel into the reaction mixture over the course of 60 minutes at 92° C.
Solids content: 29.4%
pH: 8.8
Particle size (Autosizer): 560 nm (0.11 PD)
Whiteness: 77
Dispersion C7:

The initial charge, consisting of 458 g of water and 155.3 g of dispersion B7, was heated to a temperature of 82° C. under a nitrogen atmosphere in a polymerization vessel equipped with an anchor stirrer, reflux condenser and two feed vessels and, following addition of 12.8 g of a 2.5% strength solution of sodium persulfate, polymerization was commenced for 5 minutes. Then preemulsion 1, consisting of 159 g of water, 6.7 g of arylsulfonate (15% strength), 9.8 g of methacrylic acid and 156 g of styrene, was metered in together with 16.8 g of a 2.5% strength solution of sodium persulfate over the course of 90 minutes at 82° C. After the end both feeds, the internal temperature was raised to 92° C. over the course of 30 minutes and then preemulsion 2, consisting of 14 g of water, 0.5 g of arylsulfonate (15% strength) and 13.6 g of α-methylstyrene, was added and the mixture was stirred for 5 minutes, followed by the addition of 26 g of 10% strength aqueous ammonia; the reaction mixture was stirred at 92° C. for a further 15 minutes. Subsequently 3.6 g of a 2.5% strength solution of sodium persulfate were metered in over the course of 3 minutes. Preemulsion 3, consisting of 157 g of water, 5.9 g of arylsulfonate (15% strength), 20.2 g of methyl methacrylate and 198 g of styrene, was metered in together with 23.7 g of a 2.5% strength solution of sodium persulfate over the course of 100 minutes at 92° C. Finally polymerization was continued for 30 minutes. Residual monomers were reduced by a final chemical deodorization. For this purpose 12.0 g of a 10% strength solution of tert-butyl hydroperoxide and 12.0 g of a 10% strength solution of ascorbic acid were metered in parallel into the reaction mixture over the course of 60 minutes at 92° C.

Solids content: 29.4%
pH: 8.8
Particle size (Autosizer): 578 nm (0.08 PD)
Whiteness: 77

Dispersion C8:

The initial charge, consisting of 458 g of water and 154.5 g of dispersion B8, was heated to a temperature of 82° C. under a nitrogen atmosphere in a polymerization vessel equipped with an anchor stirrer, reflux condenser and two feed vessels and, following addition of 12.8 g of a 2.5% strength solution of sodium persulfate, polymerization was commenced for 5 minutes. Then preemulsion 1, consisting of 159 g of water, 6.7 g of arylsulfonate (15% strength), 9.8 g of methacrylic acid and 156 g of styrene, was metered in together with 16.8 g of a 2.5% strength solution of sodium persulfate over the course of 90 minutes at 82° C. After the end of both feeds, the internal temperature was raised to 92° C. over the course of 30 minutes and then preemulsion 2, consisting of 14 g of water, 0.5 g of arylsulfonate (15% strength) and 13.6 g of α-methylstyrene, was added and the mixture was stirred for 5 minutes, followed by the addition of 26 g of 10% strength aqueous ammonia; the reaction mixture was stirred at 92° C. for a further 15 minutes. Subsequently 3.6 g of a 2.5% strength solution of sodium persulfate were metered in over the course of 3 minutes. Preemulsion 3, consisting of 157 g of water, 5.9 g of arylsulfonate (15% strength), 20.2 g of methyl methacrylate and 198 g of styrene, was metered in together with 23.7 g of a 2.5% strength solution of sodium persulfate over the course of 100 minutes at 92° C. Finally polymerization was continued for 30 minutes. Residual monomers were reduced by a final chemical deodorization. For this purpose 12.0 g of a 10% strength solution of tert-butyl hydroperoxide and 12.0 g of a 10% strength solution of ascorbic acid were metered in parallel into the reaction mixture over the course of 60 minutes at 92° C.

Solids content: 29.3%
pH: 8.6
Particle size (Autosizer): 544 nm (0.13 PD)
Whiteness: 76

The invention claimed is:

1. A process for preparing emulsion polymer particles, comprising:
    preparing an aqueous emulsion of core stage particles, comprising:
    i) a seed; and
    ii) a swell seed comprising 55 to 100% by weight of at least one nonionically ethylenically unsaturated monomer and 0 to 40% by weight of at least one monoethylenically unsaturated hydrophilic monomer, based in each case on the total weight of a core stage polymer;
    enclosing the core stage particles in
    iii) a first shell comprising 85% to 99.9% by weight of at least one nonionically ethylenically unsaturated monomer and 0.1% to 15% by weight of at least one hydrophilic monoethylenically unsaturated monomer; and
    iv) a second shell ensheathing the first shell, comprising 85% to 99.9% by weight of at least one nonionically ethylenically unsaturated monomer and 0.1% to 15% by weight of at least one hydrophilic monoethylenically unsaturated monomer;
    to obtain unswollen core shell particles in the aqueous emulsion; adding
    v) at least one plasticizer monomer having a ceiling temperature of less than 181° C. to the aqueous emulsion of the swollen core shell particles;
    vi) neutralizing the aqueous emulsion of the swollen core shell particles to a pH of at least 7.5 with a base to obtain an aqueous emulsion of swollen core shell particles having a hollow core;
    enclosing the swollen core shell particles in
    vii) a third shell comprising 90% to 99.9% by weight of at least one nonionically ethylenically unsaturated monomer and 0.1% to 10% by weight of at least one hydrophilic monoethylenically unsaturated monomer; and
    viii) optionally further enclosing the enclosed swollen particles in at least one shell comprising at least one nonionically ethylenically unsaturated monomer and at least one hydrophilic monoethylenically unsaturated monomer;
    wherein a polymerization inhibitor or reducing agent is not added to the aqueous emulsion of the unswollen core shell particles.

2. The process according to claim 1, wherein a weight ratio of the swell seed (ii) to the seed polymer (i) is 2:1 to 50:1.

3. The process according to claim 1, wherein an average particle size, in the unswollen state, of the core stage polymer is 100 to 400 nm.

4. The process according to claim 1, wherein a glass transition temperature, determined by the Fox equation, of the core stage polymer is between −20° C. and 150° C.

5. The process according to claim 1, wherein a weight ratio of the core stage polymer to the first shell (iii) is 20:1 to 1:1.

6. The process according to claim 1, wherein the first shell polymer (iii) has a glass transition temperature, determined by the Fox equation, of between −60° C. to 120° C.

7. The process according to claim 1, wherein a particle size of stage (iii), in the unswollen state, is 120 nm to 500 nm.

8. The process according to claim 1, wherein a weight ratio of the first shell (iii) to the second shell (iv) is 1:30 to 1:1.

9. The process according to claim 1, wherein a glass transition temperature of the second shell polymer (iv) according to the Fox equation is 50 to 120° C.

10. The process according to claim 1, wherein an average particle size of stage (iv) is 200 to 1500 nm.

11. The process according to claim 1, wherein the at least one plasticizer monomer having a ceiling temperature of less than 181° C. is selected from the group consisting of α-methylstyrene, esters of 2-phenylacrylic acid/atropic acid, 2-methyl-2-butene, 2,3-dimethyl-2-butene, 1,1-diphenylethene and methyl 2-tert-butylacrylate.

12. The process according to claim 1, wherein the base for the neutralization is selected from the group consisting of alkali metal compounds, alkaline earth metal compounds, ammonia, primary amines, secondary amines, and tertiary amines.

13. The process according to claim 1, wherein a weight ratio of the third shell (vii) to the second shell (iv) is 5:1 to 1:2.

14. The process according to claim 1, wherein a glass transition temperature of the third shell polymer (vii) according to the Fox equation is 50 to 120° C.

15. An aqueous emulsion, comprising:
water and
the polymer particles prepared by the process according to claim 1.

16. The process according to claim 1, wherein the at least one plasticizer monomer (v) has a ceiling temperature of less than 95° C.

17. The process according to claim 1, wherein the aqueous emulsion of swollen core shell particles is neutralized to a pH of at least 8.

18. The process according to claim 11, wherein the plasticizer monomer is selected from the group consisting of methyl, ethyl, n-propyl, and n-butyl esters of 2-phenylacrylic acid/atropic acid.

19. The process according to claim 12, wherein the base for the neutralization is selected from the group consisting of sodium hydroxide, potassium hydroxide, calcium hydroxide, magnesium oxide, and sodium carbonate.

20. The process according to claim 12, wherein the base for the neutralization is selected from the group consisting of ethylamine, propylamine, monoisopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminethylamine, 2,3-diaminopropane, 1,2-propylenediamine, dimethylaminopropylamine, neopentanediamine, hexamethylenediamine, 4,9-dioxadodecane-1,12-diamine, polyethyleneimine, and polyvinylamine.

21. A product comprising the emulsion polymer particles prepared by the process according to claim 1, wherein the product is selected from a paint, a paper coating, a cosmetic, or a foam.

22. A thermoplastic molding composition comprising as an impact modifier the emulsion polymer particles prepared by the process according to claim 1.

\* \* \* \* \*